3,316,193
POLYESTER RESINS PREPARED FROM TRIMETHYLOL PROPANE DIALLYL ETHER
Herbert Walter Chatfield, Croydon, England, assignor, by mesne assignments, to Vantorex Limited, Loughborough, England
No Drawing. Filed Dec. 26, 1962, Ser. No. 247,272
Claims priority, application Great Britain, Jan. 4, 1962, 338/62
6 Claims. (Cl. 260—23.5)

This invention relates to the production of air drying polyester resins, that is to say, resins the molecules of which include units linked together by ester linkages.

Many polyester resins are already known, finding extensive use as adhesives and moulding or potting resins. In some cases they are used as such, and in other cases, polymerisable vinyl compounds are acrylic compounds are incorporated with them. Outside the field of drying oils, or of synthetic resins derived from them or from their component acids, there are however relatively few ester type resins ("ester bodies") which can be used as air drying coating compounds to give a film which will become tack free at room temperature within a reasonable length of time, as the result of an oxidation or oxygen-stimulated reaction.

It has now been discovered that air drying unsaturated ester resins can be obtained by the reaction of trimethylol propane diallyl ether and a saturated dicarboxylic acid, or anhydride.

An important feature of this reaction is that it is one between a saturated dicarboxylic acid and a mono hydroxy allyl ether. In this respect, the reaction is unlike most of those hitherto proposed for the production of polyester resins, which have involved reaction between an acid having at least two reactive carboxylic groups and an alcohol having at least two reactive hydroxy groups. The resin molecule forming reaction may therefore be expected to entail both esterification and polymerisation, the esterification being in general easy to control because of its relatively limited extent.

Suitable acids and anhydrides include orthophthalic acid or anhydride, and isophthalic, terephthalic, adipic, succinic, sebacic and azelaic acids, and tetrahydrophthalic acid and its anhydride. As is customary in ester resin practice, other ingredients may be incorporated for modifying the properties of the final resin, including for example other mono hydric alcohols, polyhydric alcohols, saturated mono carboxylic acids, unsaturated dicarboxylic acids such as maleic acid of the corresponding anhydride, and drying oil fatty acids or esters thereof with polyhydric alcohols. It is a feature of the present invention that in many cases, satisfactory oil modified air drying resins can be obtained where the drying oil fatty acids is polyunsaturated as for example in the case of the relatively highly unsaturated fatty acid from linseed oil.

Resins produced in accordance with the invention may in general be applied as coatings from solution in a volatile solvent such as xylol with the addition of driers such as cobalt naphthenate.

The following examples illustrate how the invention may be carried into effect.

EXAMPLE 1

| | Parts by weight |
|---|---|
| Trimethylol propane diallyl ether | 428 |
| Phthalic anhydride | 148 |
| Xylol | 12 |

The two first named were reacted together in the presence of the xylol by heating first at 220 deg. C. the temperature being raised later in order to encourage the esterification to completion. The xylol is present so that the esterification proceeds under azeotropic conditions, but it is not an essential feature of the reaction.

The following figures are typical:

| Reaction Temp., deg. C. | Duration of Processing at temp. (hours) | Acid Value |
|---|---|---|
| 220 | 2½ | 40.5 |
| 220 | 5 | 28 |
| 240 [1] | 3 | 18 |
| 240 | 4 | 14 |
| 240 | 6 | 7 |

[1] Note the times of processing at 240 deg. C. are in addition to the earlier period of 5 hours at 220 deg. C.

The above temperatures are not limiting, for example, substantial esterification occurs at 190 deg. C.

This final resin is transparent and compatible i.e. without phase separation and is soluble in aromatic hydrocarbons like xylol.

A solution of the resin in xylol with the addition of driers such as cobalt naphthenate, was applied as coatings, and the coatings assessed for drying properties at prevailing air temperature.

0.3% cobalt metal calculated on the resin was added and the coatings for assessment were 0.0015 inches thick. (wet).

Drying properties at air temperature

After 2 hours—Coating beginning to set.
After 4 hours—Coating solidified throughout its thickness.
After 6 hours—Good toughness achieved.
After 11 hours—A tough scratch resistant coating achieved.

The rate of drying or conversion can be accelerated if the prevailing temperature is increased, and it was found that if the temperature were 120 deg. C. the coating was converted into a tough condition after about one hour's exposure without cobalt drier, or in 30 minutes when cobalt drier was present.

EXAMPLE 2

| | Parts by weight |
|---|---|
| Trimethylol propane diallyl ether | 214 |
| Phthalic anhydride | 55.5 |
| Linseed oil fatty acids | 71.0 |

The above were reacted at 220 deg. C. with the following results:

| Reaction Temp., deg. C. | Duration of Processing at temp. (hours) | Acid Value |
|---|---|---|
| 220 | 2 | 4.18 |
| 220 | 4 | 33.8 |
| 220 | 7 | 24.2 |

With cobalt drier present (0.03% cobalt calculated on the resin) a coating dried to a tough condition in 19–30 hours at air temperature. At 120 deg. C. 30 to 60 minutes were necessary to achieve a tough coating.

EXAMPLE 3

| | Parts by weight |
|---|---|
| Trimethylol propane diallyl ether | 551 |
| Tetrahydro phthalic anhydride | 90 |
| Maleic anhydride | 57 |
| Xylol | 14 |

The above materials were reacted together under azeotropic distillation conditions, for 6½ hours at 190° C. The acid value after 6 hours had fallen to 31.5. The final resin was generally as described with reference to Example 1. However, the resin, in addition to being air drying, was particularly useful as a stoving enamel and would heat-convert readily without the necessity of any driers being present.

EXAMPLE 4

A resin was prepared as described in Example 1, except that the phthalic anhydride was replaced by the equivalent amount of tetrahydro phthalic anhydride. After 5 hours at 240° C., the acid value had dropped to 12.5.

A solution of the resin in xylol, with the addition of cobalt naphthenate, would air-dry very satisfactorily, except that a slight tendency to wrinkling was noted. It was found that this tendency, and the same tendency occasionally found with other formulations, could be controlled by the incorporation of soluble lead or zirconium compounds such as lead naphthenate and zirconium naphthenate. These materials act to suppress the wrinkling sometimes induced in these polyester ether varnishes under the influence of cobalt driers.

I claim:
1. An air drying resin comprising the reaction product of resin forming proportions of trimethylol propane diallyl ether and a saturated dicarboxylic acid.
2. An air drying resin comprising the reaction product of resin forming proportions of trimethylol propane diallyl ether and a saturated dicarboxylic anhydride.
3. An air drying resin comprising the reaction product of resin forming proportions of trimethylol propane diallyl ether and an acidic material selected from the group consisting of orthophthalic acid, orthophthalic acid anhydride and isophthalic, terephthalic, adipic, succinic, sebacic and azelaic acids, and tetrahydrophthalic acid and its anhydride.
4. A method of producing an air drying resin which comprises reacting resin forming proportions of trimethylol propane diallyl ether and acidic material selected from the group consisting of orthophthalic acid, orthophthalic acid anhydride and isophthalic, terephthalic, adipic, succinic, sebacic and azelaic acids, and tetrahydrophthalic acid and its anhydride at a temperature of from about 190 C. and 240° C. until a resin is obtained which is soluble in xylol.
5. A method of obtaining an air drying resin which comprises reacting resin forming proportions of trimethylol propane diallyl ether, phthalic anhydride and drying oil fatty acids at a temperature of from about 190° C. to 240° C. under conditions conducive to esterification until a resin is obtained which is soluble in xylol.
6. A method of obtaining a resin which comprises reacting resin forming proportions of trimethylol propane diallyl ether, an acid anhydride selected from the group consisting of phthalic and tetrahydro phthalic anhydrides, and maleic anhydride at a temperature of from about 190° C. to 240° C. under conditions conducive to esterification until a resin is obtained which is soluble in xylol, the amount of maleic anhydride being less than the amount of the phthalic or tetrahydro phthalic anhydride but being sufficient to impart stove/drying properties to the resulting resin.

References Cited by the Examiner

UNITED STATES PATENTS

| | | | |
|---|---|---|---|
| 2,852,487 | 9/1958 | Maker | 260—861 |
| 3,057,824 | 10/1962 | Le Bras et al. | 260—22 |
| 3,253,938 | 5/1966 | Hunt | 106—252 |
| 3,268,484 | 8/1966 | Costanza et al. | 260—78.5 |

FOREIGN PATENTS

| | | |
|---|---|---|
| 548,137 | 9/1942 | Great Britain. |

LEON J. BERCOVITZ, *Primary Examiner.*

R. W. GRIFFIN, *Assistant Examiner.*